United States Patent [19]

Alberts et al.

[11] 4,439,589

[45] Mar. 27, 1984

[54] PROCESS FOR THE PREPARATION OF COPOLYMERS OF STYRENE AND/OR ITS DERIVATIVES

[75] Inventors: Heinrich Alberts, Cologne; Rüdiger Schubart, Bergisch-Gladbach; Alfred Pischtschan, Kuerten, all of Fed. Rep. of Germany

[73] Assignee: Bayer Aktiengesellschaft, Leverkusen, Fed. Rep. of Germany

[21] Appl. No.: 460,489

[22] Filed: Jan. 24, 1983

Related U.S. Application Data

[63] Continuation of Ser. No. 243,612, Mar. 13, 1981, abandoned.

[30] Foreign Application Priority Data

Mar. 18, 1980 [DE] Fed. Rep. of Germany ....... 3010347

[51] Int. Cl.$^3$ .................. C08F 212/10; C08K 5/06
[52] U.S. Cl. ................... 526/209; 524/367; 524/755; 526/329.2; 526/342
[58] Field of Search ............ 526/209, 329.2, 342; 524/367, 755

[56] References Cited

U.S. PATENT DOCUMENTS

| | | | |
|---|---|---|---|
| 2,846,424 | 8/1958 | Mino | 526/209 |
| 2,984,648 | 5/1961 | Williams et al. | 526/209 |
| 3,359,249 | 12/1967 | Hopff et al. | 526/329.7 |
| 3,931,128 | 1/1976 | Takizawa et al. | 526/342 |
| 4,088,811 | 5/1978 | Harris et al. | 526/342 |
| 4,182,820 | 1/1980 | Curfman et al. | 526/342 |
| 4,254,247 | 3/1981 | Boileau et al. | 526/209 |

*Primary Examiner*—Harry Wong, Jr.
*Attorney, Agent, or Firm*—Connolly and Hutz

[57] ABSTRACT

A process for the preparation of copolymers of styrene and/or its derivatives by polymerization of one or more aromatic monovinyl compounds and acrylonitrile and/or methacrylonitrile wherein up to 75% by weight of the monomer mixture may be replaced by $C_1$—$C_{20}$-alkyl esters of acrylic and/or methacrylic acid and polymerization is carried out in the presence of from 0.01 to 10% by weight, based on the total quantity of monomers, of one or more enol ethers derived from aliphatic or cycloaliphatic aldehydes or ketones.

6 Claims, No Drawings

PROCESS FOR THE PREPARATION OF COPOLYMERS OF STYRENE AND/OR ITS DERIVATIVES

CROSS REFERENCE TO RELATED APPLICATION

This application is a continuation of application Ser. No. 243,612 filed Mar. 13, 1981 and now abandoned.

This invention relates to a process for the preparation of copolymers of styrene and/or its derivatives, (meth)acrylonitrile and optionally (meth)acrylic acid alkyl esters using enol ethers as molecular weight regulators. It relates in particular to a process for the preparation of such copolymers using cycloaliphatic unsaturated enol ethers which not only act as molecular weight regulators but also have a stabilizing effect on the polymer formed.

Alkylmercaptans are well tried regulating systems commonly used in the art. Regulating systems which are free from sulphur, such as those mentioned, for example, in Houben-Weyl, Methoden der organischen Chemie, Georg Thieme Verlag, Stuttgart, 1961, Vol XIV/1, page 327 et seq. are also frequently used. Regulating systems which are free from sulphur generally have the advantage over mercaptan regulators of having a less noxious odour and less tendency to oxidation but they generally also have the disadvantage of a substantially lower transfer activity so that they have to be used at higher concentrations to produce comparable molecular weights. Specific examples of unsaturated molecular weight regulators include 1-methyl-cyclohexene-1 (U.S. Pat. No. 3,265,677), terpinols (German Auslegeschrift No. 1,795,395) and α-methylstyrene dimers (German Patent No. 966,375), which have been used for the polymerisation of styrene and acrylic acid derivatives.

It has now been found that, when enol ethers which are free from sulphur are used as molecular weight regulators for the polymerisation of mixtures of aromatic vinyl compounds, (meth)acrylonitrile and optionally (meth)acrylic acid alkyl esters, they have a regulating activity comparable to that of alkylmercaptans without the disadvantages of mercaptans, such as their odour and tendency to oxidation. Unsaturated cycloaliphatic enol esters are particularly suitable as molecular weight regulators.

This invention thus provides a process for the preparation of copolymers of styrene and/or its derivatives by polymerisation of (a) 95–20% by weight of one or more aromatic monovinyl compounds and (b) 5–80% by weight of acrylonitrile and/or methacrylonitrile, such that the sum of monomer mixtures (a) and (b) is 100% by weight, characterised in that the polymerisation is carried out in the presence of from 0.01–10% by weight, based on the total quantity of monomers, of one or more enol ethers derived from aliphatic or cycloaliphatic aldehydes or ketones.

The enol ethers are preferably used in a proportion of 0.05 to 1% by weight, based on the total quantity of monomers.

This invention also relates to the products obtained by the process according to the invention.

Suitable monomers for the preparation of the copolymers, apart from (meth)acrylonitrile, include mononuclear aromatic monovinyl compounds, i.e. styrene and its derivatives, e.g. $C_1$–$C_4$-alkyl-substituted styrenes such as α-methylstyrene, vinyl toluene and 4-tert.-butyl styrene, and halogen-substituted styrenes such as 4-chlorostyrene. Up to 75% by weight of the monomer mixture of aromatic monovinyl compounds and (meth)acrylonitrile used for preparing the copolymers may be replaced by $C_1$–$C_{20}$-alkyl esters, preferably $C_1$–$C_8$-alkyl esters, of acrylic and/or methacrylic acid.

The enol ethers used act as molecular weight regulators and at the same time influence the molecular non-uniformity of the polymers obtained. The non-uniformity $U=(M_w/M_n)-1$ lies within the range of $U=1.0$ to 2.5.

Important advantages of the enol ethers used according to the invention compared with the alkylmercaptans generally used in the art are that, while having a comparable regulating activity, they are odourless, have no tendency to oxidize and exert an additional stabilizing influence on the polymers under thermal stress. This stabilizing effect may be enhanced by the use of additional synergistic antioxidant stabilizer combinations when processing the polymers under thermoplastic conditions.

The polymers prepared by the process according to the invention have intrinsic viscosities of $\eta=0.5$–1.5 [dl/g] determined in dimethylformamide at 25° C. The molecular weights determined by the method of light scattering are in the range of from 20,000 to 250,000. The polymers have a random structure.

Enol ethers derived from aliphatic or cycloaliphatic aldehydes or ketones and alkyl, cycloalkyl or aralkyl alcohols are suitable for the process according to the invention.

Suitable alcohols include $C_1$–$C_{20}$-alkanols which may be branched or unsaturated, $C_5$–$C_{10}$ cycloalkanols and $C_7$–$C_{20}$ aralkyl alcohols in which the cycloalkyl or aryl group may be substituted by lower alkyl groups. Examples include methanol, ethanol, n-propanol, isobutanol, 2-ethylhexanol, cyclohexanol and benzyl alcohol.

The cycloaliphatic aldehydes or ketones may be substituted in the ring or bridged and/or may contain a double bond. Examples include butyraldehyde, valeraldehyde, cyclohexylaldehyde, cyclohexenyl aldehyde, methylcyclohexyl aldehyde, dimethyl-cyclohexenyl aldehyde bicyclo-[2,2,1]-hexenylaldehyde and cyclohexanone. Cycloaliphatic aldehydes or ketones optionally substituted in the ring by one or two $C_1$–$C_5$-alkyl groups, in particular by methyl groups, are preferred.

Enol ethers of aliphatic or cycloaliphatic alcohols containing an additional unconjugated double bond in the aldehyde group are preferred.

Examples of enol ethers which may be used in the process according to the invention are given in the following Tables 1–5.

TABLE 1

Enol ether (1)

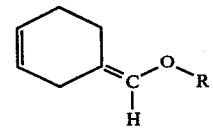

| R | Boiling Point Torr/°C |
|---|---|
| —CH₂—C₆H₅ | |
| —CH₃ | 25/89 |
| —C₂H₅ | 16/72 |
| -n-C₃H₇ | 11/86 |
| -n-C₄H₉ | 17/106–108 |
| -iso-C₄H₉ | 17/99–100 |
| -n-C₅H₁₁ | 14/116 |
| -n-C₈H₁₇ | 0.08/110 |
| -3,4,5-trimethylhexyl | 0.15/93 |
| -n-C₁₀H₂₁ | 0.12/111–112 |
| -n-C₁₂H₂₅ | 0.08/113 |
| —C₁₈H₃₇ | 0.05/195–200 |
| —C₆H₁₁ (cyclohexyl) | 0.1/82 |

TABLE 2

Enol ether (2)

| R₁ | R₂ | R | Boiling Point Torr/°C |
|---|---|---|---|
| CH₃ | H | —CH₂—C₆H₅ | 0.08/99 |
| CH₃ | H | -n-C₄H₉ | |
| CH₃ | H | -n-C₆H₁₃ | 29/130 |
| CH₃ | H | -2-ethyl-hexyl | 0.07/84–85 |
| CH₃ | H | -n-C₈H₁₇ | 0.08/103 |
| CH₃ | H | -n-C₉H₁₉ | 0.06/90 |
| CH₃ | H | -n-C₁₀H₂₁ | 0.06/106–108 |
| CH₃ | H | -n-C₁₂H₂₅ | 0.07/136 |
| CH₃ | H | -n-C₁₄H₂₉ | 0.07/165 |
| CH₃ | H | -n-C₁₆H₃₃ | 0.075/173–175 |
| CH₃ | H | —C₆H₁₁ (cyclohexyl) | 0.08/79 |
| CH₃ | CH₃ | —CH₂—C₆H₅ | 0.07/107 |
| CH₃ | CH₃ | —C₆H₁₃ | 0.08/99 |

TABLE 3

Enol ether (3)

| R | Boiling point Torr/°C |
|---|---|
| —CH₂—C₆H₅ | 0.055/106 |
| 2-ethylhexyl | 0.12/89–90 |
| -n-C₁₀H₂₁ | 0.05/114–116 |
| 3,4,5-trimethylhexyl | 0.14/100 |

TABLE 4

Enol ether (4)

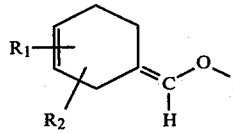

| R | Boiling point Torr/°C |
|---|---|
| —CH₂—C₆H₅ | 0.07/83 |
| 2-ethylhexyl | 0.075/72–73 |

TABLE 5

Enol ether (5)

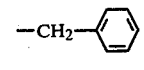

| R | Boiling point Torr/°C |
|---|---|
| -2-ethylhexyl | 0.66/68–69 |
| -3,4,5-trimethylhexyl | 0.22/82–83 |
| —CH₂—C₆H₅ | 0.11/92–94 |

It is preferred to use enol ethers corresponding to formula (6):

wherein R₁ and R₂ are identical or different and denote hydrogen or a C₁–C₅-alkyl group and R denotes a C₁–C₁₈-alkyl, cyclohexyl or benzyl group.

The preparation of enol ethers has been fully described in the literature, for example in Houben-Weyl, Methoden der Organischen Chemie, Volume VI/3, page 90, publishers Georg Thieme Verlag, Stuttgart, 1965. One method suitable for all enol ethers is the synthesis from the aldehyde by way of the acetal as as intermediate stage.

The enol ethers used as molecular weight regulators are put into the process in quantities of from 0.01 to 10% by weight, preferably from 0.05 to 1% by weight, based on the sum of the monomers. The enol ethers may be added at any stage of the polymerisation although part of the enol ether used as regulator is preferably added at the onset of polymerisation.

The polymerisation process according to the invention may be carried out in a homogeneous or a heterogeneous phase, i.e. in organic solution or suspension, by emulsion or suspension polymerisation in the aqueous phase, or by mass polymerisation, for example in the melt.

Polymerisation in the homogeneous or heterogenerous phase is carried out at temperatures of from −10° C. to 300° C., depending on the initiator system used, preferably at temperatures of from 60° to 200° C. It may be carried out at pressures of from 50 to 760 Torr, preferably from 400 to 760 Torr or at 1 to 100 bar, preferably 1 to 25 bar.

Polymerisation may be carried out continuously or batchwise.

It may be carried out in the presence of agents which release radicals, such as UV light or other high energy radiation, optionally in combination with sensitizers or radical formers such as peroxides. It is preferably initiated by compounds which supply radicals.

The initiators are used in quantities of from 0.001 to 2% by weight, preferably from 0.05 to 0.4% by weight, based on the total quantity of monomers.

The polymerisation initiators used may be, for example, per compounds or they may be azo compounds which supply radicals. The following are examples: aliphatic azodicarboxylic acid derivatives such as azobisisobutyric acid nitrile or azodialkylcarboxylic acid esters, peroxides such as lauroyl peroxide, succinyl peroxide, dibenzoyl peroxide, p-chlorobenzoyl peroxide, 2,4-dichlorobenzoyl peroxide, ketone peroxides such as methyl ethyl ketone peroxide, methyl isobutyl ketone peroxide, cyclohexanone peroxide, acetyl acetone peroxide, alkyl esters of peracids such as tert.-butyl perpivalate, tert.-butyl peroctoate, tert.-butyl perbenzoate, tert.-butyl perisononanate, per-tert.-butyl-permaleate and tert.-butyl peracetate, percarbonates such as dicyclohexyl- and diisopropyl-percarbonate, dialkylperoxides such as di-tert.-butyl-peroxide and dicumyl peroxide, hydroperoxides such as tert.-butyl- or cumenehydroperoxide, isophthalic monoperacid and acetylcyclohexane sulphonylperoxide.

Peroxides and radical starters prepared in situ may also be used. Suitable reactions for the preparation of these compounds in situ include, for example, the reaction of phosgene, chloroformic acid esters, acid halides, isocyanates or diisocyanates with hydrogen peroxide or hydroperoxides.

Suitable water-soluble initiators include hydrogen peroxide and the alkali metal and alkaline earth metal salts of per acids or peroxo acids. Ammonium and potassium peroxydisulphate are preferably used. Water-soluble initiators are used for the polymerisation in a heterogeneous or homogeneous aqueous phase.

Polymerisation may also be started by means of redox systems. For this purpose there may be used, for example, combinations of hydrogen peroxide and reducing agents such as, for example, ascorbic acid and heavy metal salts such as salts of iron or copper in addition to combinations of potassium or ammonium peroxydisulphate with alkali metal pyrosulphites.

The initiator system may be widely varied to produce special effects; such initiator and redox systems are described in Houben-Weyl, Methoden der Organischen Chemie, 1961, Volume XIV/1.

When the process according to the invention is carried out in an aqueous suspension, dispersing agents are required for obtaining perfect bead polymers. Examples of suitable dispersing agents include polyvinyl alcohol and partially saponified polyvinyl acetates, and derivatives of cellulose or of starch, e.g. methyl, ethyl and hydroxyethyl celluloses. Examples of synthetic dispersing agents (copolymers of hydrophilic and hydrophobic monomers) include the following: copolymers of styrene and acrylic acid, copolymers of styrene and maleic acid anhydride, copolymers of ethylene and acrylic acid, copolymers of ethylene and maleic acid anhydride, copolymers of acrylic acid esters and acrylic acid, copolymers of (meth)acrylic acid derivatives and (meth)acrylic acid, polyethylene oxides, copolymers of ethylene and propylene oxide and polyesters having OH numbers of from 10 to 250.

When mixtures of dispersing agents and emulsifiers are to be used, biologically degradable emulsifiers are preferred. Inorganic colloids and inorganic salts (for example phosphoric acid derivatives) may also be used. Polymerisation in aqueous suspension is preferably carried out at temperatures of from 40° to 150° C. at about 1 to 25 bar.

The aqueous suspension polymerisation process may also be carried out as a reverse emulsion polymerisation (water-in-oil) or it may be started as a reverse emulsion polymerisation and completed as a suspension polymerisation in water.

If this method is employed, a solution of the monomers and a radical former is prepared (organic phase) and water is then added to the organic phase to produce a water-in-oil emulsion, preferably with the aid of water-in-oil emulsifiers. The initiators or initiator system may also be present in the water. In the system to be polymerised, therefore, water, which optionally contains the initiator or initiator system, proportions of the monomers and all or part of the water-in-oil emulsifier, constitutes the disperse phase while the continuous phase consists of the remaining monomers or the total quantity of monomers. Copolymerisation may alread set in during preparation of the water-in-oil emulsion. After formation of the water-in-oil emulsion (first stage), an additional quantity of water and optionally dispersing agents are added to the water-in-oil emulsion with stirrings in a second stage. Phase reversal gradually takes place with formation of an oil-in-water dispersion in which water mainly constitutes the continous phase and oil the disperse phase. At the end of polymerisation the oil droplets dispersed in water have completely solidified to porous beads containing water.

The water in oil emulsifiers, which are used in quantities of from 0.05 to 10% by weight, preferably from 0.5 to 4% by weight, based on the quantity of monomers may be, for example, graft products of styrene or other vinyl monomers on polyethers of ethylene oxide or styrene copolymers containing $\alpha,\beta$-unsaturated carboxylic acids or a 1:1 copolymer of methacrylic acid and methyl methacrylate. Other water-in-oil emulsifiers are also suitable, for example, those mentioned in British Pat. Nos. 928,621; 962,699; 959,131; 964,195 and 1,076,319, German Pat. Nos. 1,300,286 and 1,211,655 and Belgian Pat. No. 785,091.

The proportion by weight of the aqueous phase to the organic phase used in the preparation of the water-in-oil emulsion (first stage) should preferably be within the range of from 0.2:1 to 1:1 although it may lie above or below these limits, provided a water-in-oil emulsion can be formed, but it should not exceed 3:1. When preparing the water-in-oil emulsion, it is advisable to add the aqueous phase to the organic phase.

The enol ethers may be added with the solution of the monomers or at a later stage, but at the latest before phase reversal.

The polymerisation temperatures in the first stage are from 30° C. to 120° C., preferably from 60° C. to 85° C. Polymerisation is preferably continued until from 10 to 60% by weight of the monomers have been converted.

The proportion by weight of aqueous phase to oil phase in the second stage is preferably within the range of 1:1 to 3:1 and is suitably not higher than 10.1. The water-in-oil emulsion may be prepared at temperatures of from 10° C. to 90° C. The addition of water and of dispersing agent, if any, in the second stage is carried out after formation of the water-in-oil emulsion and heating or cooling to the polymerisation temperature of the second stage, which is from 40° C. to 180° C., preferably from 75° C. to 150° C.

The dispersing agents are used in quantities of from 0.01 to 3% by weight, preferably from 0.5 to 2% by weight, based on the quantity of monomers. Compounds which have proved to be suitable dispersing agents include polyvinyl alcohol, partially saponified polyvinyl acetate, alkyl celluloses such as methyl cellulose, alkyl sulphonates and alkyl sulphates.

One particular advantage of this process is that the bead polymer obtained, wich has a porous structure, can easily be worked up and drying presents no problem.

If the process according to the invention is carried out in one of the usual organic solvents, polymerisation is begun in a homogeneous phase of the monomers, the chosen initiator system, the solvent and the enol ether. If the solvent used is not a solvent for the polymer formed, the last stages of polymerisation are carried out as a precipitation or suspension polymerisation. Suitable organic solvents used include saturated aliphatic and aromatic hydrocarbons, substituted aromatic compounds such as toluene or chlorobenzene, halogenated aliphatic hydrocarbons, such as methylene chloride, carbon tetrachloride, tricholorethylene, tetrachloroethylene, trichlorofluoromethane and other aliphatic chlorofluorohydrocarbons or fluorohydrocarbons, low boiling alcohols such as methanol, ethanol, propanol, isopropanol or the isomeric butanols, preferably ter.-butanol, and also dimethylformamide or dimethylacetamide.

The process according to the invention may also be carried out as an emulsion polymerisation.

The alkali metal salts of modified resinic acids, such as sodium salts of hydrogenated abietic acid, may be used as emulsifiers but alkyl sulphates and sulphonates having 12 to 24 C-atoms in the alkyl group are also suitable. Biologically degradable emulsifiers are preferred. The emulsifiers may be used in a concentration of from 0.05 to 20% by weight, preferably from 0.5 to 3% by weight, based on the aqueous phase. They may, of course, be used in any combination with the above mentioned dispersing agents.

The polymer may be isolated, if desired, by precipitation from the emulsion by known methods or by, for example, spray drying.

Copolymerisation may be carried out with or without solvents in polymerisation apparatus such as screw extruders, kneaders or special stirrer apparatus. The solvents and residual monomers are removed from the polymerisation mixtures by evaporation in evaporator screws, thin layer evaporators, evaporator coils or spray driers. The polymerisation reaction mixtures may contain the usual auxiliary agents such as chain-transfer agents for telomerisation, other molecular weight regulators if required in addition to the enol ethers, stabilizers, lubricants, antistatic agents and antioxidants.

To protect the finished polymer from unwanted oxidation during thermoplastic processing, a sufficient quantity, preferably from 0.3 to 1.5% by weight, of phenolic antioxidants are added. These have a powerful synergistic effect with special enol ethers. Compounds containing from 1 to 4 sterically hindered phenolic hydroxyl groups in the molecule are suitable phenolic antioxidants.

The following are mentioned as examples of such antioxidants:

Monophenols such as:
2,6-di-tert.-butyl-p-cresol; 2,6-di-tert.-octyl-p-cresol; 2-tert.-butyl-6-cyclopentyl-p-cresol; 2-tert.-butyl-6-cyclohexyl-p-cresol;
2,4-dimethyl-6-α-methylcyclohexylphenol;
2,6-di-octadecyl-p-cresol;
2,6-di-tert.-butyl-4-phenyl-phenol;
2,6-di-methylbenzyl-p-cresol; and 3-(3,5-di-tert.-butyl-4-hydroxyphenyl)-propionic acid octyl ester;

Bis-phenols such as:
2,2-methylene-bis-(4-methyl-6-tert.-butyl-phenol);
2,2-methylene-bis-(4-ethyl-6-tert.-butyl-phenol);
2,2-methylene-bis-(4-methyl-6-nonyl-phenol);
2,2-methylene-bis-(4-methyl-6-α-methylcyclohexyl-phenol);
2,2-n-butylidene-bis-(4,6-dimethyl-phenol);
2,2-isobutylidene-bis-(4,6-dimethyl-phenol);
2,2-thio-bis-(4-methyl-6-tert.-butyl-phenol);
4,4-n-butylidene-bis-(2,6-di-tert.-butyl-phenol);
4,4-n-buylidene-bis-(2-tert.-butyl-5-methyl-phenol);
4,4-thio-bis-(2-tert.-butyl-5-methyl-phenol);
1,4-bis-(3,5-di-tert.-butyl-4-hydroxy-benzyl)-2,3,5,6-tetramethyl-benzene; bis-(3,5-di-tert.-butyl-4-hydroxybenzyl)-sulphide; 1,2-ethylene glycol-bis-3-(3,5-di-tert.-butyl-4-hydroxyphenyl)-propionic acid ester;

Tris-phenols such as:
1,1,3-tris-(3,5-dimethyl-4-hydroxyphenyl)-propane;
1,1,3-tris-(5-tert.-butyl-4-hydroxy-2-methyl-phenyl)butane;
1,3,5-tris-(3,5-di-tert.-butyl-4-hydroxy-benzyl)-2,4,6-trimethyl-benzene; and trimethylolpropane-tris-3-(3,5-di-tert.-butyl-4-hydroxyphenyl)-propionic acid ester;

Tetra-phenols such as:
pentaerythritol-tetra-3-)3,5-di-tert.-butyl-4-hydroxyphenyl)-propionic acid ester.

Since they have little colour themselves, the thermoplastic copolymers prepared according to the invention can be coloured in exceptionally brilliant tones with known dyes or pigments. The products according to the invention are generally obtained in a pulverulent form or in the form of beads, depending on the method of preparation employed and the monomer combination. They may be used for all kinds of shaped products. The copolymers may also be used for the formation of films or coatings.

EXPERIMENTAL PART

In the following examples, the percentages given refer to weight unless otherwise indicated. The intrinsic viscosity [dl/g] was determined at 25° C. in dimethylformamide.

The reaction of methyl-tetrahydrobenzaldehyde and benzyl alcohol is described as an example of synthesis of an enol ether. All enol ethers are obtainable by this method.

SYNTHESIS OF THE ENOL ETHER FROM METHYL TETRAHYDROBENZALDEHYDE AND BENZYL ALCOHOL

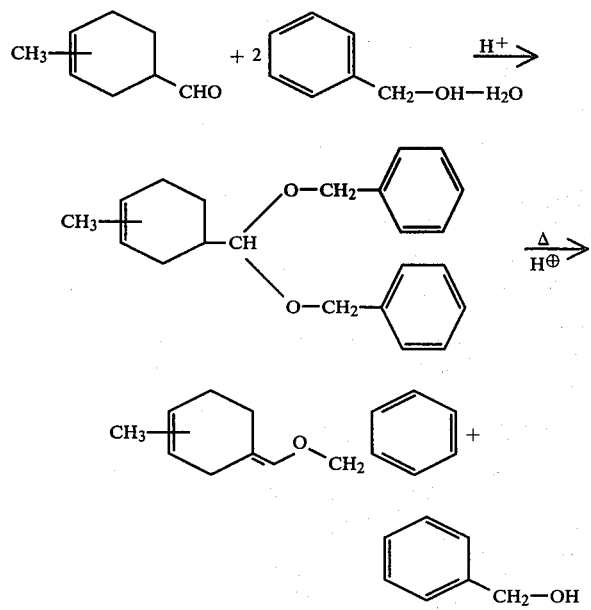

Enol ether synthesis proceeds by two stages. The aldehyde and alcohol are first reacted under azeotropic additions with the aid of an acid catalyst to form the acetal which is then decomposed in the heat to the enol ether, also in the presence of an acid catalyst. All the compounds used were prepared in analogous manner.

Synthesis of the enol ether as represented in the above reaction scheme is given as an example.

484 g (3.9 mol) of a mixture of 3- and 4-methylcyclohexene-3-aldehyde-(1) were reacted with 970 g (~9 mol) of benzyl alcohol and a mixture of 3.44 g of p-toluene sulphonic acid and 3 g of quinoline in 300 ml of cyclohexene with liberation of $H_2O$. As soon as all the water has been split off, the product is concentrated by evaporation under vacuum. The residue is distilled at reduced pressure. A low boiling fraction of benzyl alcohol and enol ether is first obtained. The product is obtained pure by refractioning at bp.$_{0.08\ mm}$ 99° C.; $n_D^{20}$: 1.5451.

GENERAL METHOD 1400 ml of water,
111 g of styrene,
90 g of acrylonitrile,
63 g of sodium alkyl sulphonate,
0.44 g of potassium peroxydisulphate and
1.0 g of enol ether as molecular weight regulator are introduced into a 5 l stirrer vessel under nitrogen.

The reaction mixture is heated to 80° C. and stirred at this temperature for 30 minutes. Solution 1 and Solution 2 are then introduced into the autoclave within 100 minutes.

SOLUTION 1

1000 g of styrene,
350 g of acrylonitrile
10.0 g of regulator (enol ether)

SOLUTION 2

15 g of sodium alkyl sulphonate and
4.0 g of potassium peroxydisulphate dissolved in 1600 ml of water.

The reaction mixture is then stirred for one more hour at 80° C. After determination of the solids content and the pH, the emulsion is coagulated and worked up. The intrinsic viscosity in dimethylformamide at 25° C. and the acrylonitrile content of the dry reaction product obtained are determined. The enol ethers used in Examples 1 to 40 and the data mentioned above are shown in the following Tables 6 to 11.

TABLE 6

| Example Serial No. | Regulator R = | pH | Polymer emulsion Solids Content (% by weight) | Viscosity ($\eta$) (dl/g) | Copolymer acrylonitrile content (% by weight) |
|---|---|---|---|---|---|
| 1 | —CH$_2$—C$_6$H$_5$ | 9.1 | 35.6 | 0.87 | 24.8 |
| 2 | —CH$_3$ | 8.5 | 34.4 | 1.02 | 24.8 |
| 3 | —C$_2$H$_5$ | 8.7 | 33.5 | 0.80 | 24.6 |
| 4 | -n-C$_3$H$_7$ | 8.9 | 33.3 | 0.88 | 23.8 |
| 5 | -n-C$_4$H$_9$ | 8.5 | 33.1 | 0.74 | 22.0 |
| 6 | -iso-C$_4$H$_9$ | 8.7 | 34.3 | 0.83 | 24.6 |
| 7 | -n-C$_5$H$_{11}$ | 8.8 | 34.3 | 0.76 | 25.8 |
| 8 | -n-C$_6$H$_{13}$ | 8.6 | 33.2 | 0.77 | 24.2 |
| 9 | -n-C$_8$17 | 8.9 | 34.9 | 0.92 | 24.6 |
| 10 | -3,4,5-trimethylhexyl | 8.6 | 35.2 | 0.72 | 24.8 |
| 11 | -n-C$_{10}$H$_{21}$ | 8.5 | 33.0 | 0.77 | 24.2 |
| 12 | -n-C$_{12}$H$_{25}$ | 8.9 | 33.9 | 0.94 | 26.3 |
| 13 | -n-C$_{16}$H$_{33}$ | 8.5 | 32.6 | 1.12 | 25.6 |

TABLE 6-continued

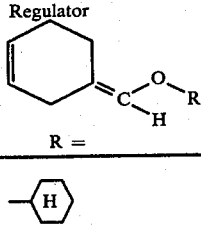

| Example Serial No. | Regulator R = | pH | Polymer emulsion Solids Content (% by weight) | Viscosity (η) (dl/g) | Copolymer acrylonitrile content (% by weight) |
|---|---|---|---|---|---|
| 14 | —⟨H⟩ | 8.1 | 35.8 | 0.80 | 26.2 |

TABLE 7

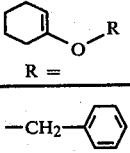

| Example | Regulator R = | pH | Polymer emulsion Solids content (% by weight) | Viscosity (η) (dl/g) | Copolymer Acrylonitrile contents |
|---|---|---|---|---|---|
| 15 | -2-ethyl-hexyl | 8.4 | 32.4 | 1.11 | 25.2 |
| 16 | -3,4,5-tri-methylhexyl | 8.8 | 34.5 | 1.21 | 24.7 |
| 17 | —CH₂—⟨⟩ | 8.5 | 33.0 | 0.93 | 27.1 |

TABLE 8

| Example Serial No. | Regulator R = | pH | Polymer emulsion Solids content (% by weight) | Viscosity (η) (dl/g) | Copolymer Acrylonitrile content (% by weight) |
|---|---|---|---|---|---|
| 18 | —CH₂—⟨⟩ | 8.7 | 33.5 | 0.77 | 25.9 |
| 19 | -2-ethyl-hexyl | 9.6 | 34.2 | 0.75 | 25.4 |
| 20 | -n-butyl | 8.0 | 34.7 | 0.78 | 25.8 |
| 21 | -n-nonyl | 8.2 | 34.3 | 0.72 | 26.2 |
| 22 | -n-decyl | 8.2 | 35.2 | 0.82 | 26.2 |
| 23 | -n-hexyl | 7.9 | 37.6 | 0.76 | 25.6 |
| 24 | —(CH₂)₁₃—CH₃ | 8.4 | 34.3 | 1.14 | 25.7 |
| 25 | —⟨H⟩ | 8.05 | 34.3 | 0.76 | 25.9 |
| 26 | (CH₂)₇—CH₃ | 8.01 | 25.0 | 0.72 | 26.3 |
| 27 | (CH₂)₁₁—CH₃ | 8.25 | 33.3 | 0.96 | 25.0 |
| 28 | (CH₂)₁₅—CH₃ | 8.2 | 34.6 | 0.76 | 24.2 |

TABLE 9

| Example Serial No. | Regulator R = | pH | Polymer emulsion Solids content (% by weight) | Viscosity (η) (dl/g) | Copolymer Acrylonitrile content (% by weight) |
|---|---|---|---|---|---|
| 29 | —CH₂—⟨⟩ | 8.4 | 33.7 | 1.03 | 25.8 |
| 30 | —CH₂—⟨⟩ | 8.5 | 33.5 | 1.23 | 26.7 |
| 31 | 2-ethyl-hexyl | 8.6 | 34.3 | 1.18 | 26.3 |
| 32 | —C₁₀H₂₁ | 8.7 | 34.8 | 1.22 | 25.0 |
| 33 | -3,4,5-tri-methylhexyl | 8.5 | 32.8 | 1.16 | 25.0 |

TABLE 10

| Example Serial No. | Regulator | Polymer emulsion pH | Solids content (% by weight) | Copolymer Viscosity (η) (dl/g) | Acrylonitrile content (% by weight) |
|---|---|---|---|---|---|
| 34 | 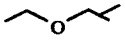 | 8.5 | 33 | 1.12 | 24.7 |
| 35 | 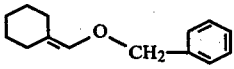 | 8.6 | 34.7 | 1.08 | 25.0 |
| 36 | 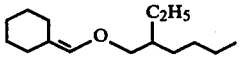 | 8.8 | 34.6 | 1.08 | 20.4 |

TABLE 11

| Example Serial No. | Regulator | Polymerisation pH | Solids Content (% by weight) | Copolymer Viscosity (η) (dl/g) | Acrylonitrile content (% by weight) |
|---|---|---|---|---|---|
| 37 | 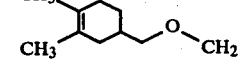 | 8.05 | 34.6 | 0.79 | 24.4 |
| 38 | 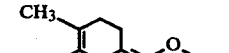 | 8.65 | 35.3 | 0.69 | 24.2 |
| 39 | Comparison experiments without regulator | | 35.5 | 1.42 | 25.4 |

EXAMPLE 40

The following are introduced at room temperature into a 5 l stirrer vessel equipped with grid stirrer, which has been flushed with nitrogen:

3000 g of styrene,
1000 g of acrylonitrile,
35 g of regulator from Example No. 18.

50 ml of an initiator solution (Solution 1) are introduced into the reaction mixture. The mixture is then heated to 93° C. When a conversion of 15% has been reached, Solution 2 is added continuously. The rate of addition of initiator (Solution 1) is regulated according to the reaction temperature.

SOLUTION 1

200 g of tert.-butyl perpivalate in 3800 g of toluene

SOLUTION 2

7640 g of acrylonitrile,
19980 g of styrene,
220 g of regulator from Example No. 18.

The rate of throughput is 7.5 kg/hour. The amount of monomer conversion during the stationary state is 28%.

A stabilizer solution (Solution 3) is added at the rate of 150 g/hour to the reaction product discharged from the reactor.

SOLUTION 3

80 g of 2,6-di-tert.-butyl-p-cresol,
160 g of 2,2'-methylene-bis(4-methyl-6-α-methyl-cyclohexyl-phenol)
3760 g of toluene.

The polymer syrup is worked up in an evaporator screw and then granulated.

Analytical data of the copolymer:

$[\eta] = 0.71 [dl/g]$

Acrylonitrile content: 26.5% by weight.

We claim:

1. A process for the preparation of a copolymer of styrene and/or a derivative thereof by polymerization of
   (a) 95–20% by weight of at least one aromatic monovinyl compound,
   (b) 5–80% by weight of at least one member selected from the group consisting of acrylonitrile and methacrylonitrile, and
   (c) 0–75% by weight, based on the combined weight of (a) and (b), of at least one member selected from the group consisting of $C_1$–$C_{20}$-alkyl esters of acrylic and methacrylic acid, the sum of
   (a), (b) and (c) being 100% by weight, wherein polymerization is carried out in the presence of 0.01 to 10% by weight, based on the total quantity of monomers of at least one enol ether derived from an aliphatic of cycloaliphatic aldehyde or ketone.

2. The process of claim 1 wherein from 0.05 to 1% by weight, based on the total quantity of monomers of said enol ether is used.

3. The process of claim 1 wherein said enol ether is selected from the group consisting of

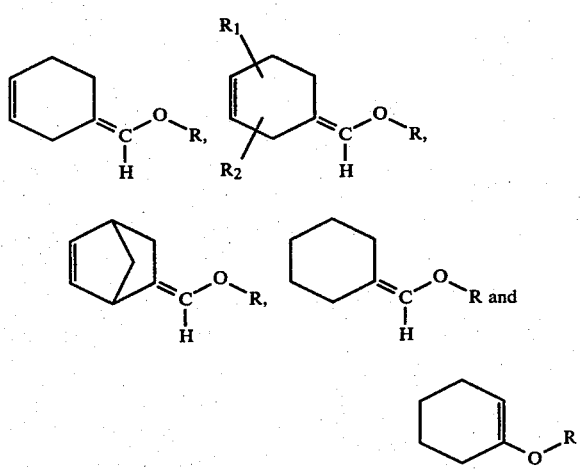

wherein R¹ and R² are identical or different and are selected from the group consisting of hydrogen and $C_1$–$C_5$-alkyl and R is selected from the group consisting of $C_1$–$C_{20}$-alkyl, $C_5$–$C_{10}$-cycloalkyl, and $C_7$–$C_{20}$-aralkyl.

4. The process of claim 1 wherein said enol ether is of the formula

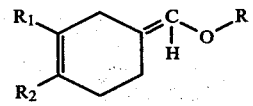

wherein $R_1$ and $R_2$ are identical or different and are selected from the group consisting of hydrogen and $C_1$–$C_5$-alkyl and R is selected from the group consisting of $C_1$–$C_{18}$-alkyl, cyclohexyl or benzyl.

5. The process of claim 1 wherein (a) is styrene and (b) is acrylonitrile.

6. The process of claim 1 wherein polymerization is carried out in emulsion, suspension or in bulk.

* * * * *